(12) United States Patent
Fu et al.

(10) Patent No.: US 6,825,137 B2
(45) Date of Patent: Nov. 30, 2004

(54) LIGHTWEIGHT BALLISTIC RESISTANT RIGID STRUCTURAL PANEL

(75) Inventors: Robert Chipin Fu, San Pedro, CA (US); John Fales, Los Angeles, CA (US)

(73) Assignee: Telair International Incorporated, Rancho Dominguez, CA (US)

( * ) Notice: Subject to any disclaimer, the term of this patent is extended or adjusted under 35 U.S.C. 154(b) by 184 days.

(21) Appl. No.: 10/028,499

(22) Filed: Dec. 19, 2001

(65) Prior Publication Data

US 2003/0114064 A1 Jun. 19, 2003

(51) Int. Cl.[7] ............... B32B 27/12; B32B 27/04
(52) U.S. Cl. ............... 442/135; 442/2; 442/6; 442/10; 442/134; 442/164; 442/169; 442/170; 442/221; 442/226; 442/239; 442/251; 442/253; 442/254; 442/255; 442/261; 442/286; 428/911; 2/2.5
(58) Field of Search ............... 428/911; 2/2.5; 442/2, 6, 10, 134, 135, 164, 169, 170, 286, 239, 251, 253, 254, 255, 261, 221, 226

(56) References Cited

U.S. PATENT DOCUMENTS

| 3,969,563 A | * | 7/1976 | Hollis, Sr. ............... 428/175 |
| 4,034,137 A | | 7/1977 | Hofer |
| 4,181,768 A | | 1/1980 | Severin |
| 4,200,677 A | | 4/1980 | Bottini et al. |
| 4,608,717 A | | 9/1986 | Dunbavand |

(List continued on next page.)

FOREIGN PATENT DOCUMENTS

| EP | 0641988 | 3/1995 |
| EP | 0678724 | 10/1995 |
| FR | WO 96/17219 | 6/1996 |
| FR | 2764370 | 12/1998 |
| WO | WO 00/35753 | 6/2000 |

OTHER PUBLICATIONS

AL Coordination by Office of Law Enforcement Standards, National Institute of Standards & Technology, Gaithersburg, MD; Prepared for National Institute of Justice, Office of Science & Technology, Washington, DC; National Institute of Justice; U.S. Department of Justice, Office of Justice Programs Ballistic Resistance of Personal Body Armor, NIJ Standard 0101.04; Law Enforcement and Corrections Standards and Testing; NIJ Standard 0101.04 Revision A; Jun. 2001; NCJ 183651; pp. iii,v,ix,1–42.

AM Published by The National Institute of Justice's National Law Enforcement & Corrections Technology Center; Nov. 2001; U.S. Department of Justice, Office of Justice Programs, National Institute of Justice; Selection and Application Guide to Personal Body Armor, NIJ Guide 100–01 Replaces Selection and Application Guide to Police Body Armor; NIJ Guide 100–98, NCJ 189633; NIJ National Institute of Justice; Office of Science and Technology, Technology Assessment Program; Ballistic Resistant Protective Materials NIJ Standard 0108.01; pp. 1–115.

*Primary Examiner*—Ula C. Ruddock
(74) *Attorney, Agent, or Firm*—O'Melveny & Myers LLP

(57) ABSTRACT

A lightweight ballistic resistant rigid structural panel especially for use in aircraft interiors is disclosed. The rigid structural panel is made up of a core layer including a plurality of sheets of flexible, high-tensile strength fabric interleaved with a plurality of sheets of a thermal-fusible film adhesive, and a sheet of cushioning material adhered to the plurality of sheets of flexible, high-tensile strength fabric. Fiber-reinforced face skins are adhered to exterior surfaces of the panel core for structural strength and rigidity. The rigid structural panel is capable of resisting ballistic attack from handguns and like weapons, while maintaining a high degree of strength and rigidity.

19 Claims, 1 Drawing Sheet

U.S. PATENT DOCUMENTS

| | | |
|---|---|---|
| 4,650,710 A | 3/1987 | Harpell et al. |
| 4,678,702 A | 7/1987 | Lancaster et al. |
| 4,748,064 A | 5/1988 | Harpell et al. |
| 4,764,238 A | 8/1988 | Dastin et al. |
| 4,822,657 A | 4/1989 | Simpson |
| 4,968,383 A * | 11/1990 | Volkmann et al. ............ 216/65 |
| 5,006,293 A | 4/1991 | Hartman et al. |
| 5,180,880 A | 1/1993 | Zufle |
| 5,190,802 A | 3/1993 | Pilato |
| 5,200,256 A | 4/1993 | Dunbar |
| 5,317,950 A | 6/1994 | Binon et al. |
| 5,447,411 A | 9/1995 | Curley et al. |
| 5,472,769 A * | 12/1995 | Goerz et al. ................ 428/138 |
| 5,534,343 A | 7/1996 | Landi et al. |
| 5,789,327 A | 8/1998 | Rousseau |
| 5,851,932 A | 12/1998 | Dickson et al. |
| 5,918,309 A * | 7/1999 | Bachner, Jr. .................... 2/2.5 |
| 5,935,678 A | 8/1999 | Park |
| 6,237,793 B1 | 5/2001 | Fingerhut et al. |
| 6,253,655 B1 | 7/2001 | Lyons et al. |
| 6,268,301 B1 | 7/2001 | Dalman et al. |
| 6,568,310 B2 | 5/2003 | Morgan |

\* cited by examiner

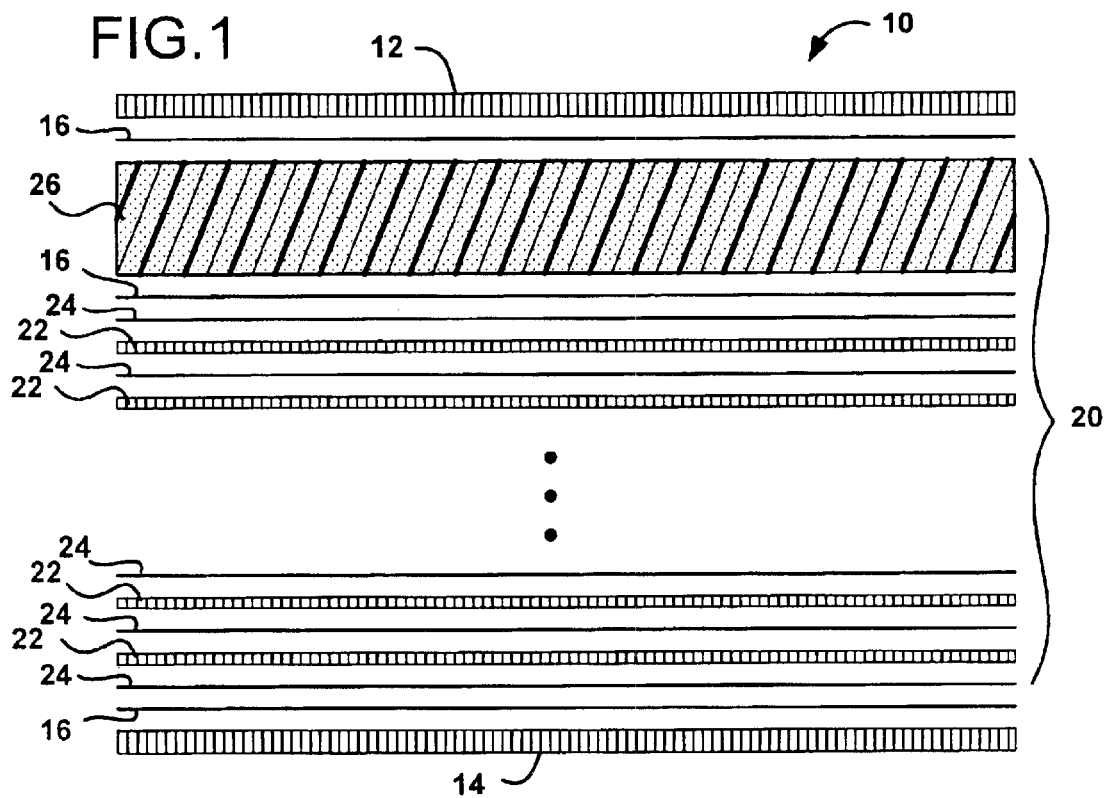
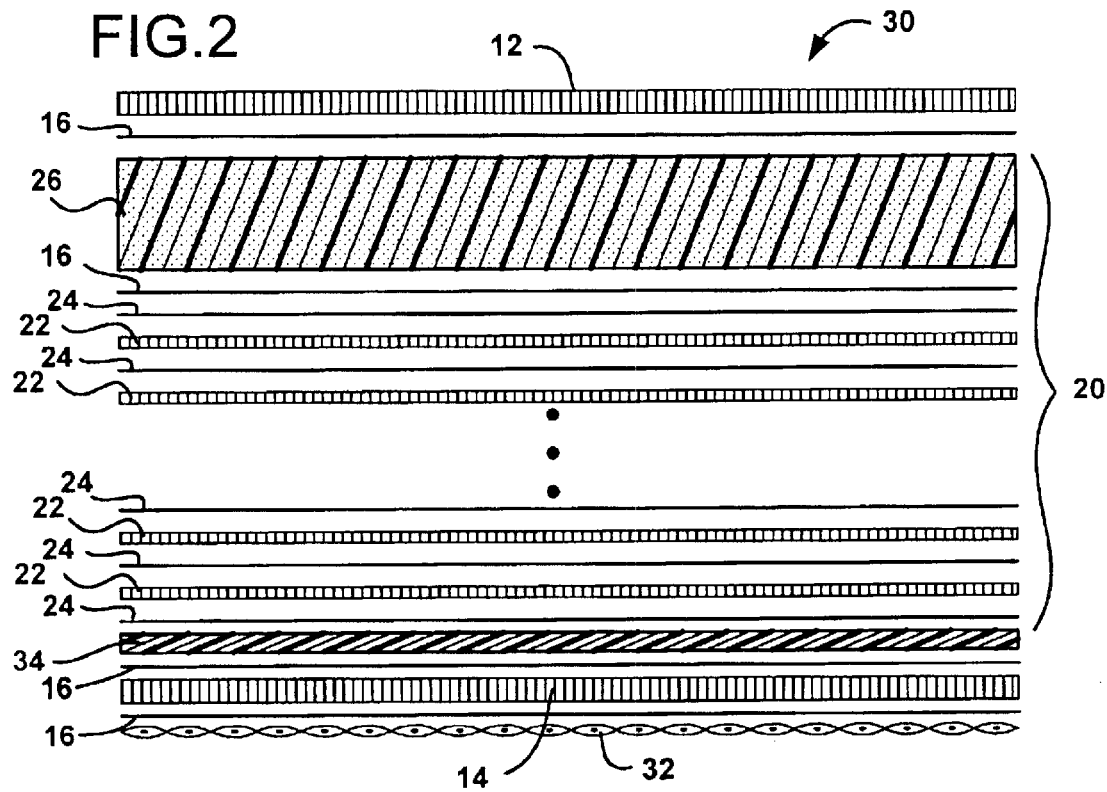

LIGHTWEIGHT BALLISTIC RESISTANT RIGID STRUCTURAL PANEL

BACKGROUND OF THE INVENTION

1. Field of the Invention

The present invention relates to lightweight rigid structural panels such as are used for interior walls, floors, and doors in aircraft, and more particularly to such panels as are designed to resist ballistic impacts from bullets, shrapnel, and like objects.

2. Description of Related Art

Lightweight rigid structural panels have long been used to construct walls, floors, and other structures in the interior of aircraft. These panels are often made by laminating sheets of structural materials such as aluminum or fiber/resin composites around a lightweight core, such as a honeycomb or foam material. The laminated structural panels possess high stiffness and favorable strength-to-weight ratios, making them well-suited for handling ordinary interior loads and uses in aircraft. Prior art interior panels suitable for aircraft have not been available for resisting destruction and penetration by ballistic objects such as bullets and shrapnel, or for resisting deformation from high force/low speed attack by objects such as battering rams, knives, cutting tools, and pry-bars. In the past, such capabilities were generally regarded as unnecessary.

Recent terrorist actions have upset conventional thinking and created an impetus for protecting the cockpit of passenger aircraft from assault and penetration from would-be intruders in the passenger cabin. A higher level of protection may be attained by constructing the cockpit bulkhead and door from suitably strong, stiff, ballistic-resistant, and cut-resistant materials. Prior art aircraft interior panel materials are not adequately strong or stiff to protect the cockpit from a determined intruder, and possess limited or no resistance to penetration from ballistic objects. At the same time, prior art ballistic protection materials are too heavy, flexible, and/or expensive to be well suited for constructing walls and door in passenger aircraft. Accordingly, a lightweight ballistic resistant rigid structural panel is desired for applications such as passenger aircraft. The panel should be capable of being used like prior art structural panels for aircraft interiors, while offering a higher degree of resistance to both ballistic and high force/low speed attacks.

SUMMARY OF THE INVENTION

The present invention provides a rigid structural panel that resists penetration by ballistic objects such as bullets or shrapnel, or by sharp cutting objects such as knives or saws, while maintaining high rigidity and strength against high force/low speed attack. The structural panel is relatively lightweight, and may be handled and used similarly to prior-art structural panels in the manufacture of aircraft interior components such as doors or bulkheads. Among the advantages of the structural panel are a superior ability to resist high force/low speed attack through greater strength and rigidity, and an ability to maintain most of this strength and rigidity after a ballistic attack. The panel preferably has a thickness in the range of about 0.38 to 2.5 inches, and an area density (weight per unit area) in the range of about 1.8 to 2.5 pounds per square foot.

The structural panel is made up of a panel core including a plurality of sheets of flexible, high-tensile strength fabric interleaved with a plurality of sheets of a thermal-fusible film adhesive, and a sheet of cushioning material adhered to the plurality of sheets of flexible, high-tensile strength fabric. Fiber-reinforced face skins are adhered to exterior surfaces of the panel core for structural strength and rigidity.

The flexible, high-tensile strength fabric may be a woven or non-woven material, preferably made of a high-tensile fiber material such as aramid fiber, ultra-high molecular weight polyethylene fiber, or PBO fiber. Each of the sheets of flexible, high-tensile strength fabric should have a tensile breaking strength not less than about 100 pounds per inch of fabric width for every ounce per square yard of material $$\left(\frac{\text{lbf}/\text{in}}{\text{oz}/\text{yd}^2}\right).$$

For example, a 16-ounce fabric should have a breaking strength not less than 1600 pounds. The panel core preferably has not less than 12 and not more than 33 sheets of high-strength fabric. As an assembly, the panel core is preferably not less than 0.25 inches thick, and not greater than 2 inches thick. The sheets of thermal-fusible film adhesive may be made of an ionic copolymer, epoxy, polyurethane, or other thermoplastic material. The thermal-fusible film adhesive is used in a quantity sufficient to consolidate the panel core and provide good structural strength and fatigue resistance, without sacrificing the ballistic resistance provided by the sheets of high-tensile strength fabric. The sheet of cushioning material may be selected from an aramid honeycomb material, an aluminum honeycomb material, a polyurethane foam material, or other cushioning materials. The sheet of cushioning material should have a density not less than 3 pounds per cubic foot and not greater than 8 pounds per cubic foot.

The face skins of the structural panel provide structural strength and rigidity to the panel. They also assist in flattening ballistic projectiles before the projectiles reach the panel core, thereby improving the ballistic resistance of the panel core. Suitable materials for the face skins include unidirectional glass fibers or fiberglass woven materials impregnated with a phenolic resin. The face skins are preferably not less than 0.01 inches thick, and not greater than 0.10 inches thick. They should have a tensile strength of 40,000 pounds per square inch, or higher.

In an embodiment of the invention, a hardened layer is adhered to an outer surface of the face skin facing the passenger cabin, to provide resistance to cutting by sharp objects. For example, a stainless steel mesh may be laminated to an outer surface of one of the face skins. In addition, to enhance resistance to attack by motorized cutting tools, one or more layers of gummy resin may be laminated to or within other layers in the panel core.

A more complete understanding of the lightweight ballistic resistant rigid structural panel will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 1 is an exploded cross-sectional diagram showing the layer structure of an exemplary structural panel according to the invention.

FIG. 2 is an exploded cross-sectional diagram showing the layer structure of an exemplary structural panel according to an alternative embodiment of the invention.

DETAILED DESCRIPTION OF THE PREFERRED EMBODIMENT

The present invention provides a lightweight ballistic resistant rigid structural panel for use in aircraft that overcomes the limitation of prior-art aircraft interior panels. In the detailed description that follows, like element numerals are used to indicate like elements that appear in one or more of the drawings.

A schematic view of the structural panel material 10 according to an embodiment of the invention is shown in FIG. 1, showing the layered structure of the panel in an exploded view. In overview, face skins 12, 14 enclose panel core 20, which comprises a plurality of interleaved layers of high-tensile strength fabric 22 and film adhesive 24 adjacent to a cushioning layer 26. The cushioning layer 26 may be adhered to the plurality of high-strength fabric layers 22 and film adhesive layers 24 using a compatible resin, such as a phenolic resin 16. Resin 16 may also be used to adhere the face skins 12, 14 to the panel core 20. Face skins 12, 14 preferably have a thickness in the range of about 0.06 to 0.20 inches. Panel 10 has a strength and stiffness equal to or greater than prior-art aircraft interior panels of equivalent thickness. Panel 10 may be made to any desired thickness and substituted for prior-art interior panels in constructing aircraft interior components such as walls, bulkheads, doors, and floors.

Face skins 12, 14 are selected from a suitably high-tensile strength material for providing the primary strength and rigidity of the panel 10. Preferably, the face skin has a tensile strength of at least 40,000 pounds per square inch, high toughness, a favorable strength-to-weight ratio, and is compatible with the resin system and other materials used in the panel core 20. Suitable materials include fiberglass woven material in 18, 20, or 22 oz. (ounce per square yard) weights and various 7781 E-glass fabrics, preferably as phenolic resin prepreg material. Crossed layers of unidirectional fabric may provide slightly greater strength per unit weight than woven material, but may add to manufacturing costs. S-glass may also be used instead of E-glass, but is substantially more expensive. E-glass woven material in the indicated weights is believed to provide adequate performance at a favorable cost. The phenolic resin used to impregnate the fiberglass woven material advantageously is flame-resistant, so the face skins 12, 14 provide fire protection for panel 10.

Higher strength fibers, such as aramid or carbon fibers, are more expensive than E-glass, but may be used for greater strength and stiffness if desired. In the alternative, relatively tough metals such as #304 stainless steel may be used for face skins 12 or 14 in some applications. Sheet metal face skins, however, may require the use of substantially heavier face skins to achieve a panel stiffness comparable to that achievable using the fiber composite face skins disclosed herein. Generally, a high panel stiffness is desirable for resisting forced entry by low speed attack instruments. Fiber composite face skins may therefore be preferred for aircraft applications because of the high modulus to weight ratios of fiber composites relative to sheet metals.

In addition to providing strength and rigidity, the face skins may also enhance the ballistic resistance of panel 10 by receiving the initial impact of a ballistic projectile and thereby flattening it, at least to a degree, so that its energy is more readily dissipated by the materials in the panel core 20. An impact with the front face skin will deform the head of the projectile, dulling sharp edges and increasing the impact profile area of the projectile. The flattened projectile will be less able to penetrate the fabric layers 22, and will more likely be retained within the panel core 20.

Accordingly, one of the face skins 12, 14 is preferably designated as the front face skin for facing the space from which a ballistic attack is sought to be prevented. For example, in the embodiment shown in FIG. 1, face skin 14 would be an appropriate choice for the front face skin, and in cockpit-hardening applications, would be oriented towards the passenger cabin. Conversely, face panel 12 would preferably be oriented towards the cockpit, because it is closest to the layer of cushioning material 26. For improved ballistic resistance, it is preferable to have cushioning material 26 behind high-strength fabric layers 22 (relative to the direction of ballistic attack), to provide room for flexure of the fabric layers when struck by a ballistic object.

Fabric layers 22 may be any suitable high-tensile strength fabric such as are known for making ballistic resistant vests and the like. Various different suitable fabrics are commercially available, including fabrics made from aramid fibers such as those sold under the trademark Kevlar®, fabrics made from ultra-high molecular weight polyethylene fibers such as those sold under the trademarks Spectra® and Dyneema®, and fabrics made from polyphehylenebenzobisoxazole (PBO) fibers such as those sold under the trade name Zylon®. Various cost and performance parameters may be considered in the selection of fabrics, but for purposes of a lightweight structural panel for aircraft interiors, aramid fibers are believed to provide a favorable cost/performance ratio. Suitable aramid fabrics for layers 22 include, but are not limited to: Kevlar® KM-2, 850 denier, 31 count plain weave style 705, 6.8 oz/yd$^2$ (breaking strength 880 lbf/in); Kevlar® 29, 3000 denier, 17 count plain weave style 745, 14.0 oz/yd$^2$ (breaking strength 1600 lbf/in); and Kevlar® 29, 3000 denier, 21 count 4×4 basket weave style 755, 16.5 oz/yd$^2$ (breaking strength 2000 lbf/in). These and similar high-tensile strength fabrics are available from numerous commercial vendors as known in the art.

The number of layers of high-tensile fabric material 22 should be selected in proportion to the weight, breaking strength, and dynamic performance of the individual layers. For example, 12 layers of 2000 lbf/in fabric would provide comparable ballistic resistance to about 14 layers of 1600 lbf/in fabric or to about 23 layers of 880 lbf/in fabric. Generally, when using aramid fiber materials as described herein, not less than 12 and not more than 33 layers of fabric material 22 are preferable.

The adhesive 24 for adhering fabric layers 22 together within panel core 20 should be selected to permit flexure of the fabric layers when struck by a ballistic object, without failure of the adhesive layers 24. In other words, the matrix of fabric layers 22 and adhesive layers 24 should be flexible and resilient to enable the fabric to deform and flex upon impact, thereby dissipating the kinetic energy of the projectile. In addition, it is desirable that the matrix not be delaminated by the impact of projectiles, so that it may better withstand a sustained attack by numerous projectiles in sequence. Various thermal-fusible materials may be used for film adhesive 24, including thermal-fusible ionic copolymer (ionomer) film, sold under the trademark Surlyn® and other names. Ionomers are ethylene acid copolymers, in which the acid groups are partially neutralized with either zinc or sodium ions. Ionic bonding between the polymer chains provides outstanding melt strength and toughness, which are particularly desirable properties for laminating the layers of high-tensile strength fabric 22. Other high-strength, flexible thermoplastic, thermoset, or epoxy adhesives are also suitable, and in particular, polyurethane materials. Of course, the selected film adhesive for layer 24 should also exhibit good adhesion to and compatibility with the selected material for fabric layers 22.

Adhesive layer 24 is preferably a film having a thickness between about 0.5 and 6 mil, and all of the adhesive films 24 in panel core 20 are preferably selected to have the same thickness. The thickness of the film layers 24 should be selected based on the weight and thickness of the surrounding fabric layers 22. For example, for use with an aramid fabric having a weight of 6.8 oz/yd$^2$ and a thickness of 12 mil, film layer 24 may be about 1 to 2 mil thick, and for an aramid fabric having a weight of 16.5 oz/yd$^2$ and a thickness of 30 mil, film layer 24 may be about 3 to 6 mil thick. It is preferable for the interleaved fabric 22 and film 24 layers in the panel core 20 to contain, in the aggregate, about 14–27 percent ionomer resin by weight. A resin content in this range permits a high degree of consolidation of the panel core, thereby achieving a high degree of structural integrity and fatigue endurance without sacrificing ballistic resistance.

A cushioning layer 26 is preferably provided adjacent to the fabric 22 and resin 24 layers. The cushioning layer provides two primary functions. It serves to thicken the panel core 20 to any desired thickness while adding relatively little weight per unit area, thereby making possible the fabrication of a very stiff yet lightweight panel 10. In addition, the cushioning layer permits internal flexure of the ballistic-resistant layers 22, 24 for greater ballistic resistance while preserving the stability of the face skins 12, 14 and especially of the rearward face skin 12, thereby preserving the structural integrity of the panel 10 while under ballistic attack.

Various suitable lightweight deformable or resilient cushioning materials are know in the art for cushioning layer 26. In particular, numerous foam or honeycomb materials are known in the art. The material may be either resilient or crushable, and should be compatible with the resin layers 16 used to laminate the face skins and cushioning layer 26 together. Suitable cushioning materials include aramid and aluminum honeycomb materials such as used in conventional aircraft panels, and polyurethane foam. The cushioning material preferably has a density between about 3 to 8 pounds per cubic foot, and a thickness from about 0.125 to 1.75 inches. The panel core 20 including both cushioning and fabric layers is preferably about 0.25 to 2.0 inches thick. Cushioning layer 26 may be omitted, if desired, but the resulting panel will be comparatively much less stiff and less tolerant of ballistic damage.

FIG. 2 shows an alternative lightweight ballistic-resistant rigid structural panel containing additional layers 32 and 34 for increased resistance to knives, blades, and motorized cutting tools. The remaining layers of panel 30 may be as previously described. Either or both of layers 32 or 34 may be omitted, without departing from the scope of the invention.

Layer 32 is a mesh or scrim of cut-resistant material, such as a stainless steel mesh, that is adhered to the outer surface of forward face skin 14 using a laminating resin 16 such as previously described. In this position, layer 32 may resist penetration of face skin 14 by cutting tools such as knives or razor blades. Preferably, layer 32 also rapidly dulls sharp metal edges to further impede a cutting attack. Accordingly, cut-resistant layer 32 should be both tough and hard while being relatively lightweight. As an alternative to or in addition to a metal mesh, layer 32 may include a scrim or mat of hard materials, such as ceramic fibers or basalt fibers. A layer of hard and/or abrasive particles such as alumina dust may optionally be included in layer 32 for greater blade-dulling effect.

Layer 34 is a gummy resin layer of tacky, resinous material, such as a petroleum-based or pine-based modified pitch, that is sufficiently fluid at application temperatures (typically, about room temperature) to flow and coat any powered cutting blade such as may penetrate face skin 14, thereby impeding further progress of the cutting blade. The tacky resin used in layer 34 should be compatible with adhesive layers 16 and 24 so as to not weaken the laminar structure of panel 30. To provide a high degree of fluidity without weakening the adhesive bonds between the face skin 14 and the panel core 20, the gummy resin may be contained within cells or channels of a suitable supporting layer, such as a honeycomb material or rigid open-celled foam as previously described for layer 26. The honeycomb or foam material preserves the structural integrity of the of the panel 30 while containing the desired reserve of gummy resin. In the alternative, or in addition, the cells or interstices of the cushioning layer 26 may be filled with the gummy resin.

FABRICATION METHOD

Various methods as known in the art may be used to assemble panels 20 and 30 such as described herein. A suitable fabrication method is described below, but the invention is not limited to structural panels fabricated according to the disclosed method.

In general, the high-tensile strength fabric layers 22 may be consolidated together with the film adhesive layers 24 in an initial step, and then the consolidated fabric/film layers consolidated with the remaining layers of the panel. To consolidate the fabric layers, the high-tensile strength fabric 22 and film adhesive 24 are cut to the desired panel size. If aramid (e.g., Kevlar®) fabric is used, it should be oven dried at about 150° F. to remove any absorbed moisture. The desired number of layers 24, 22 are stacked on top of one another. A layer of release film should be placed at the top and bottom of the stack. The stack may then be consolidated using a vacuum bag and oven at 275° F. to 300° F. under 12–14 psi pressure for 2–3 hours, or using a heat press at 275° F. to 300° F. under 12–40 psi pressure for 20 minutes to 1 hour. The stack should be cooled down to about 120° F. to 150° F. before releasing pressure.

The consolidated fabric layers may then be consolidated into the panel assembly. The desired materials may be stacked in order as shown in FIG. 1, with the back face skin 12 preferably at the lowermost layer. The face skins may be fiberglass woven material impregnated with a phenolic resin, in which case a sheet of phenolic-based film adhesive or epoxy film adhesive should be placed in the stack at the positions indicated by layer 16 in FIG. 1. If an aramid material is used for the cushioning layer, it should be oven dried as described above. The stack should be surrounded by sheets of release film and placed between two caul sheets in a heat press. The heat press should be preheated to about 275° F. to 300° F. Contact pressure of less than 3 psi should be applied for 1 to 2 minutes and the press opened (a procedure referred to as "bumping"). The bumping procedure should be repeated 3 to 5 times at 1 to 2 minute intervals, to release gas generated by the phenolic resin. The press should then be closed and the panel consolidated at 275° F. to 300° F. under 25 to 50 psi for 1 to 2 hours. The stack should then be cooled to about 120° F . to 150° F. before releasing pressure to complete the consolidation process, although the pressure may be released while the press is hot if the phenolic resin is formulated to permit "hot-in, hot-out" handling. The finished panel may be cut, sawed, drilled, etc., like prior-art aircraft structural panels.

EXAMPLE

Two lightweight ballistic resistant rigid structural panels were constructed according to the invention, having finished thicknesses of 0.5 and 1.0 inches, respectively. Each of the panels was constructed with 14 layers of style 745 Kevlar® fabric interleaved with 3 mil sheets of an ionomer film adhesive. 18-ounce fiberglass woven phenolic prepreg was used for the front and back face skins, and a phenolic-based film adhesive was used to adhere the face skins and cushioning layers to the fabric stack. An aramid (Nomex®), 4 pound per cubic foot, 0.25 inch cell honeycomb material was used as the cushioning layer. For the 0.5 inch thick panel, a 0.200 inch thick cushioning layer was used, and for the 1.0 inch panel, a 0.700 inch thick cushioning layer was used.

The completed panels were tested for ballistic resistance in accordance with the National Institute of Justice (NIJ) Standard 0101.04 and evaluated for resistance to a level IIIA threat. No ballistic penetration occurred, and a high degree of the structural integrity of the panels was retained after the panels were fired upon as follows:

1. Single shot of .44 magnum lead SW bullet fired at 16 feet distance with 1400 feet/second projectile speed.
2. Single shot of 9 mm FMJ bullet fired at 16 feet distance with 1400 feet/second projectile speed.
3. Three shots of 0.44 magnum lead SW bullet fired onto a one inch circle at 16 feet distance with 1400 feet/second projectile speed.
4. Six shots of 0.44 magnum lead SW bullet fired onto a 3.5 inch circle at 16 feet distance with 1400 feet/second projectile speed.
5. Fifteen shots of 9 mm FMJ bullet fired onto a 3.5 inch circle at 16 feet distance with 1400 feet/second projectile speed.

The panels were also tested for flammability resistance in accordance with Federal Aviation Regulation (FAR) 25.583 Appendix F Part I (a)(1)(i) (sixty second vertical burn test). The panels passed the test.

Having thus described a preferred embodiment of lightweight ballistic resistant rigid structural panel, it should be apparent to those skilled in the art that certain advantages of the within system have been achieved. It should also be appreciated that various modifications, adaptations, and alternative embodiments thereof may be made within the scope and spirit of the present invention. For example, an embodiment with a particular number of ballistic-resistant layers has been illustrated, but it should be apparent that the inventive concepts described above would be equally applicable to panels with greater or lesser numbers of ballistic resistant layers, or with panels having various different sequences of layers. The invention is further defined by the following claims.

What is claimed is:

1. A lightweight ballistic resistant rigid structural panel, comprising:
    a plurality of sheets of flexible, high-tensile strength fabric interleaved with a plurality of sheets of a fusible film adhesive;
    a sheet of cushioning material adhered to the plurality of sheets of flexible, high-tensile strength fabric to form a panel core not less than about 0.25 inches thick;
    a first fiber-reinforced face skin adhered to a surface of the panel core; and
    a second fiber-reinforced face skin adhered to the panel core opposite to the first fiber-reinforced face skin, wherein the panel core is interposed between the first fiber-reinforced face skin and the second fiber-reinforced face skin so as to stiffen the rigid structural panel by being bonded to the first and second fiber-reinforced face skins while maintaining a uniform separation therebetween, and the first and second fiber-reinforced face skins are each configured to have a tensile strength not less than about 40,000 PSI and a thickness not less than about 0.06 inches.

2. The lightweight ballistic resistant rigid structural panel of claim 1, wherein the rigid structural panel has an area density not greater than 2.5 pounds per square foot.

3. The lightweight ballistic resistant rigid structural panel of claim 1, wherein the rigid structural panel has an area density not less than 1.8 pounds per square foot and not greater than 2.5 pounds per square foot.

4. The lightweight ballistic resistant rigid structural panel of claim 1, wherein the rigid structural panel has a ballistic resistance not less than level IIIA set forth in National Institute of Justice Standard 0101.04.

5. The lightweight ballistic resistant rigid structural panel of claim 1, wherein the rigid structural panel has a rigidity not less than a honeycomb-core structural panel of equivalent thickness.

6. The lightweight ballistic resistant rigid structural panel of claim 1, wherein the rigid structural panel has an area density not greater than 2.5 pounds per square foot, a ballistic resistance not less than level IIIA set forth in National Institute of Justice Standard 0101.04, and a rigidity not less than a honeycomb-core structural panel of equivalent thickness.

7. The lightweight ballistic resistant rigid structural panel of claim 1, wherein each of the sheets of flexible, high-tensile strength fabric is selected from the group consisting of a woven fabric and a unidirectional fabric.

8. The lightweight ballistic resistant rigid structural panel of claim 1, wherein each of the sheets of flexible, high-tensile strength fabric is made from a fiber material selected from aramid fiber, ultra high molecular weight polyethylene fiber, and PBO fiber.

9. The lightweight ballistic resistant rigid structural panel of claim 1, wherein each of the sheets of flexible, high-tensile strength fabric has a tensile strength not less than 100 pounds per inch of width, for every ounce per square yard of fabric weight.

10. The lightweight ballistic resistant rigid structural panel of claim 1, wherein the sheets of flexible, high-tensile strength fabric number not less than 12 and not more than 33.

11. The lightweight ballistic resistant rigid structural panel of claim 1, wherein the panel core is not less than 0.25 inches thick, and not greater than 2 inches thick.

12. The lightweight ballistic resistant rigid structural panel of claim 1, wherein each of the sheets of fusible film adhesive is made of a material selected from an ionic copolymer, an epoxy, and a polyurethane material.

13. The lightweight ballistic resistant rigid structural panel of claim 1, wherein the sheet of cushioning material is selected from an aramid honeycomb material, an aluminum honeycomb material, and a polyurethane foam material.

14. The lightweight ballistic resistant rigid structural panel of claim 1, wherein the sheet of cushioning material has a density not less than 3 pounds per cubic foot and not greater than 8 pounds per cubic foot.

15. The lightweight ballistic resistant rigid structural panel of claim 1, wherein the first face skin and the second face skin are fiberglass woven roving materials impregnated with a phenolic resin.

16. The lightweight ballistic resistant rigid structural panel of claim 1, wherein each of the first face skin and the second face skin are not less than 0.06 inches thick, and not greater than 0.10 inches thick.

17. The lightweight ballistic resistant rigid structural panel of claim 1, further comprising a cut-resistant layer adhered to an outer surface of at least one of the first face skin and the second face skin.

18. The lightweight ballistic resistant rigid structural panel of claim 17, wherein the cut-resistant layer is a stainless steel mesh.

19. The lightweight ballistic resistant rigid structural panel of claim 1, further comprising at least one layer of gummy resin in the panel core between the first face skin and the second face skin.

* * * * *